United States Patent
Carr

(10) Patent No.: US 7,191,366 B2
(45) Date of Patent: Mar. 13, 2007

(54) METHOD AND INTELLIGENT SLAVE DEVICE TRANSFER CONTROL UNIT FOR IMPLEMENTING SEAMLESS ERROR RESUMPTION IN A SHARED MEMORY BUS STRUCTURE

(75) Inventor: Jeffery Dean Carr, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 10/787,643

(22) Filed: Feb. 26, 2004

(65) Prior Publication Data

US 2005/0229029 A1    Oct. 13, 2005

(51) Int. Cl.
*G06F 12/00* (2006.01)
(52) U.S. Cl. .................. 714/42; 714/54; 711/147; 711/149
(58) Field of Classification Search .............. None
See application file for complete search history.

(56) References Cited

U.S. PATENT DOCUMENTS

| | | | | |
|---|---|---|---|---|
| 5,604,865 A | * | 2/1997 | Lentz et al. | 710/316 |
| 5,627,992 A | * | 5/1997 | Baror | 711/133 |
| 5,754,800 A | * | 5/1998 | Lentz et al. | 710/116 |
| 6,006,303 A | * | 12/1999 | Barnaby et al. | 710/244 |
| 6,014,728 A | * | 1/2000 | Baror | 711/133 |
| 6,072,798 A | * | 6/2000 | Beasley | 370/395.72 |
| 6,219,763 B1 | * | 4/2001 | Lentz et al. | 711/151 |
| 6,415,369 B1 | * | 7/2002 | Chodnekar et al. | 711/158 |
| 6,601,126 B1 | * | 7/2003 | Zaidi et al. | 710/305 |
| 6,954,844 B2 | * | 10/2005 | Lentz et al. | 712/29 |
| 6,983,397 B2 | * | 1/2006 | Fairhurst et al. | 714/9 |
| 2002/0107971 A1 | * | 8/2002 | Bailey et al. | 709/231 |
| 2002/0194291 A1 | * | 12/2002 | Najam et al. | 709/213 |
| 2004/0022107 A1 | * | 2/2004 | Zaidi et al. | 365/202 |

* cited by examiner

*Primary Examiner*—Reginald Bragdon
*Assistant Examiner*—Horace L. Flournoy
(74) *Attorney, Agent, or Firm*—Joan Pennington

(57) ABSTRACT

A method and apparatus are provided for implementing seamless error resumption in a shared memory bus structure. Controls and data are stored for each read operation and each write operation. Each read operation and each write operation is monitored to determine when an error has occurred for either a read operation or a write operation. When an error has occurred for the read operation or the write operation, the error is suppressed and the stored controls and data are gated to continue the read operation or the write operation.

10 Claims, 4 Drawing Sheets

METHOD AND INTELLIGENT SLAVE DEVICE TRANSFER CONTROL UNIT FOR IMPLEMENTING SEAMLESS ERROR RESUMPTION IN A SHARED MEMORY BUS STRUCTURE

FIELD OF THE INVENTION

The present invention relates generally to the data processing field, and more particularly, relates to a method and apparatus for implementing seamless error resumption in a shared memory bus structure.

DESCRIPTION OF THE RELATED ART

In a shared memory bus structure, where a processor and other masters share common slaves, multiple types of errors can occur on the buses during data transfers. A great deal of performance is lost due to these transfers not being recoverable after the errors occur.

If in several of these types of error scenarios there would be a way to resume the transfers seamlessly after an error is detected, then the effective bandwidth on the buses could be optimized. The effective bandwidth could be optimized because the data transfers in these cases would not have to be re-initialized or re-arbitrated and the time to start the original transfers, by issuing all the transfer qualifiers, would not be lost.

Known solutions to this problem do not exist. Currently when transfer errors do occur, the transfers must be restarted after the errors are detected. By not enabling these transfers to continue after such errors are detected, current solutions limit the effective performance of such a shared memory bus structure.

SUMMARY OF THE INVENTION

Principal aspects of the present invention are to provide a method and apparatus for implementing seamless error resumption in a shared memory bus structure. Other important objects of the present invention are to provide such method and apparatus for implementing seamless error resumption in a shared memory bus structure substantially without negative effect and that overcome many of the disadvantages of prior art arrangements.

In brief, a method and apparatus are provided for implementing seamless error resumption in a shared memory bus structure. Controls and data are stored for each read operation and each write operation. Each read operation and each write operation is monitored to determine when an error has occurred for either a read operation or a write operation. When an error has occurred for the read operation or the write operation, the error is suppressed and the stored controls and data are gated to continue the read operation or the write operation.

A slave control unit includes a write path and a read path. Both the slave control unit write path and the slave control unit read path include an interface/host process controller for receiving and processing host commands and transfer qualifiers. A respective first-in first-out (FIFO) stores controls and data for each write operation and each read operation. An error suppress control/algorithm is provided for monitoring current operations and for suppressing and resuming an interface operation responsive to an error is detected. An operations monitor/controller controlled by the error suppress control/algorithm is provided for suppressing the error and for gating stored interface controls and stored data from the interface to continue the read operation or the write operation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
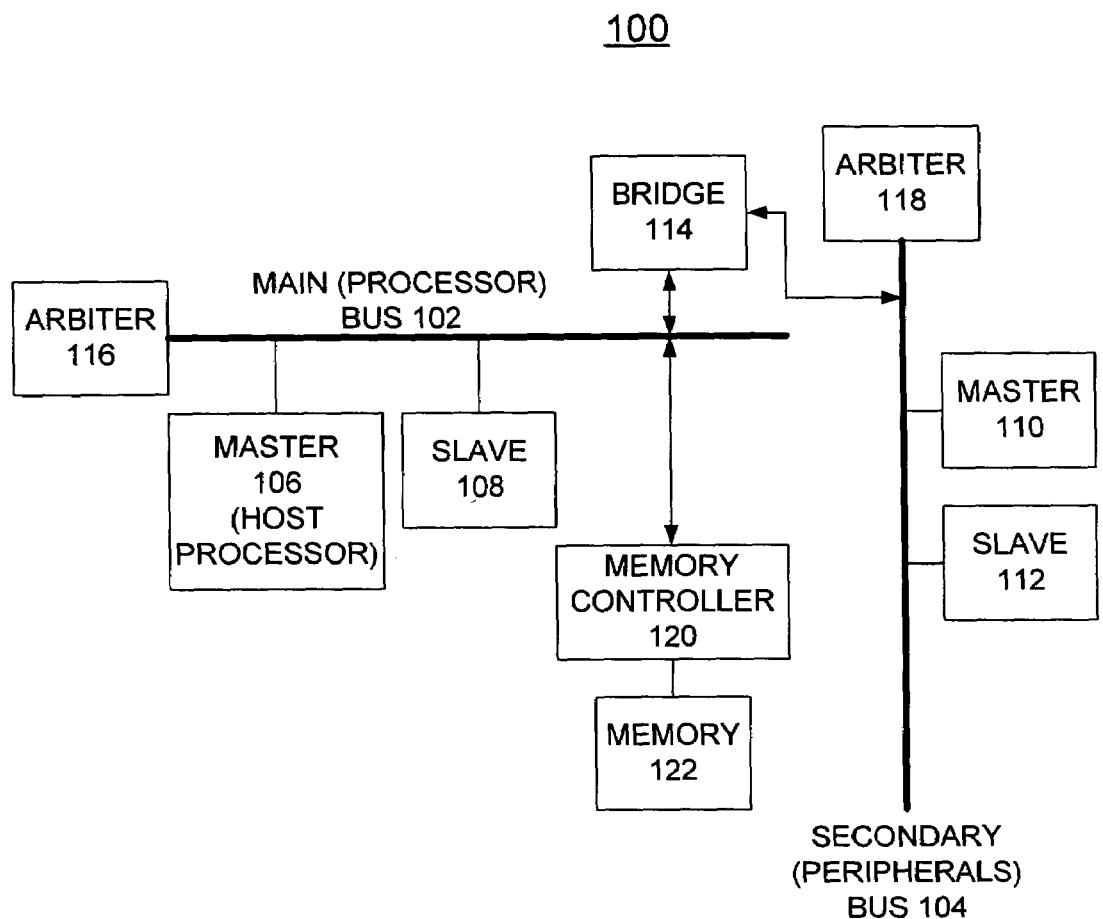
FIG. 1 is a block diagram of a shared memory system in accordance with the preferred embodiment.

Having reference now to the drawings, in FIG. 1, there is shown a shared memory system generally designated by the reference character 100 for implementing seamless error resumption in accordance with the preferred embodiment. Shared memory system 100 includes a typical shared memory bus structure with a main bus 102, such as a main processor bus 102, and a secondary bus 104, such as a secondary peripherals bus 104.

As shown in FIG. 1, a master device 106 and a slave device 108 is attached to the main processor bus 102 and a master device 110 and a slave device 112 is attached to the secondary peripherals bus 104. The main bus 102 and secondary bus 104 typically interface to several masters and slaves, such as master devices 106, 110 and slave devices 108, 112, on both buses 102, 104, directly or through bridge interconnects, such as a bridge 114. Shared memory system 100 commonly includes a host or main processor on the shared bus 102 to control operations. The master block 106 on the main processor bus 102 represents this host processor.

A respective arbiter 116, 118 is coupled to a respective one of the main processor bus 102 and the secondary peripherals bus 104. A memory controller 120 associated with a memory 122 is coupled to the main processor bus 102.

Figure 2:
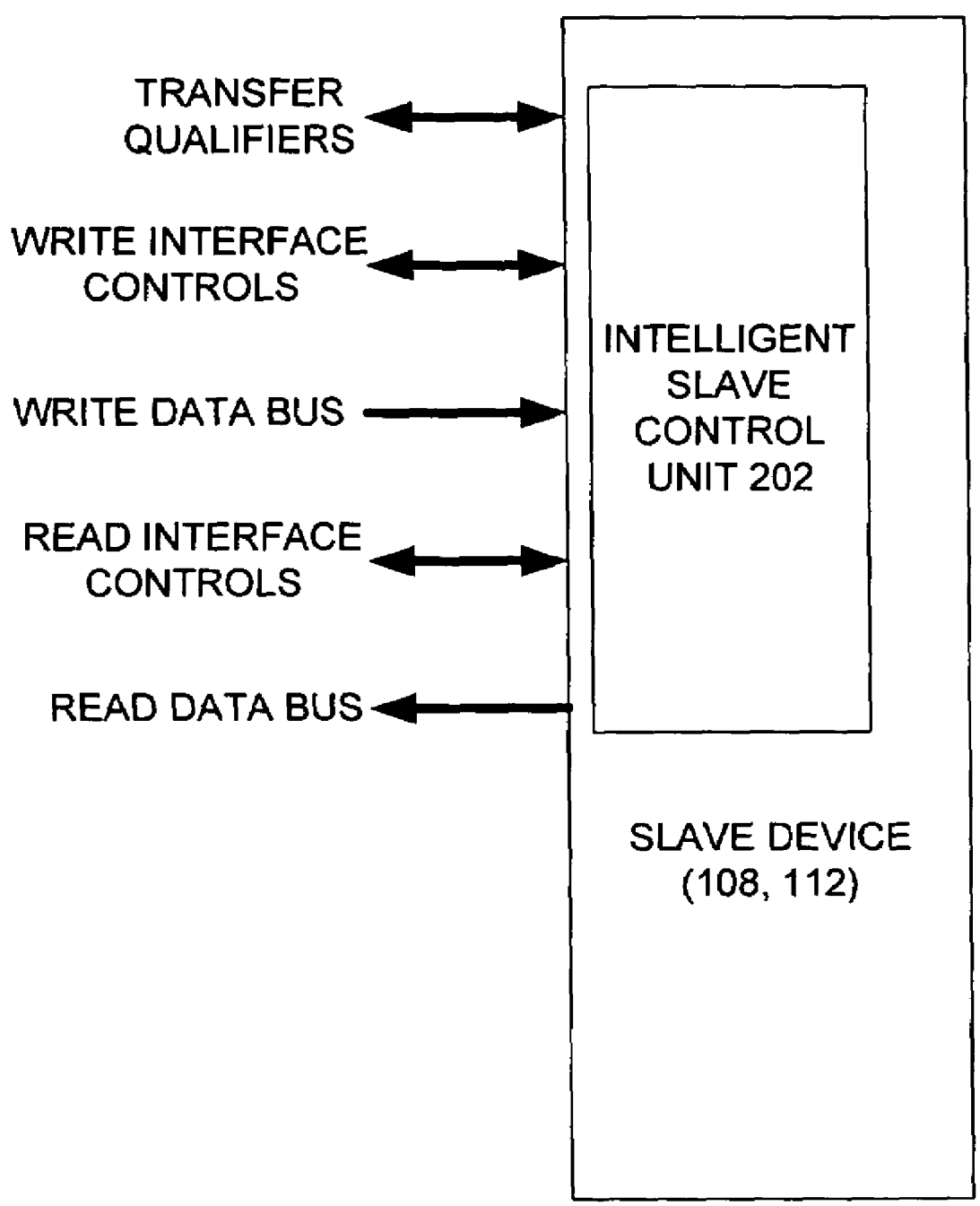
FIG. 2 is a block diagram of a slave unit together with a set of typical interface signals of the shared memory system of FIG. 1 in accordance with the preferred embodiment.

Having reference also to FIG. 2, there is shown a set of common interface signals for a typical slave unit generally designated by the reference character 200, such as slave devices 108, 112, including an intelligent slave control unit 202 of the preferred embodiment. The interface signals are separated into data interface controls for data transfers and to complete operations for both read and write paths, the data buses for each path, along with the transfer qualifiers used to initiate the operations. As shown in FIG. 2, the interface signals include transfer qualifiers, write interface controls, write data, read interface controls, and read data bus.

Figure 3:
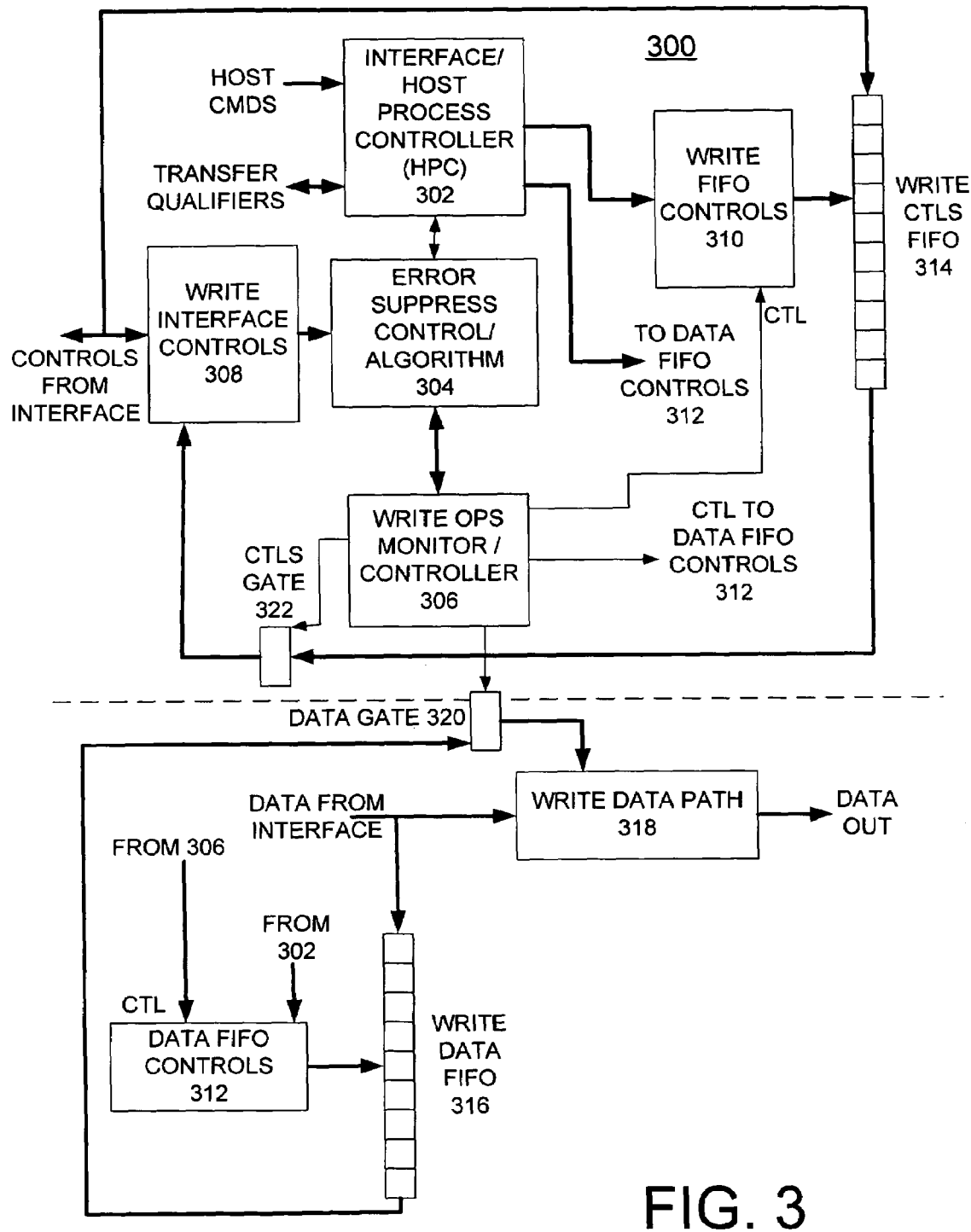
FIG. 3 is a block diagram of a write path of an intelligent slave device transfer control unit of the shared memory system of FIG. 1 in accordance with the preferred embodiment.
Figure 4:
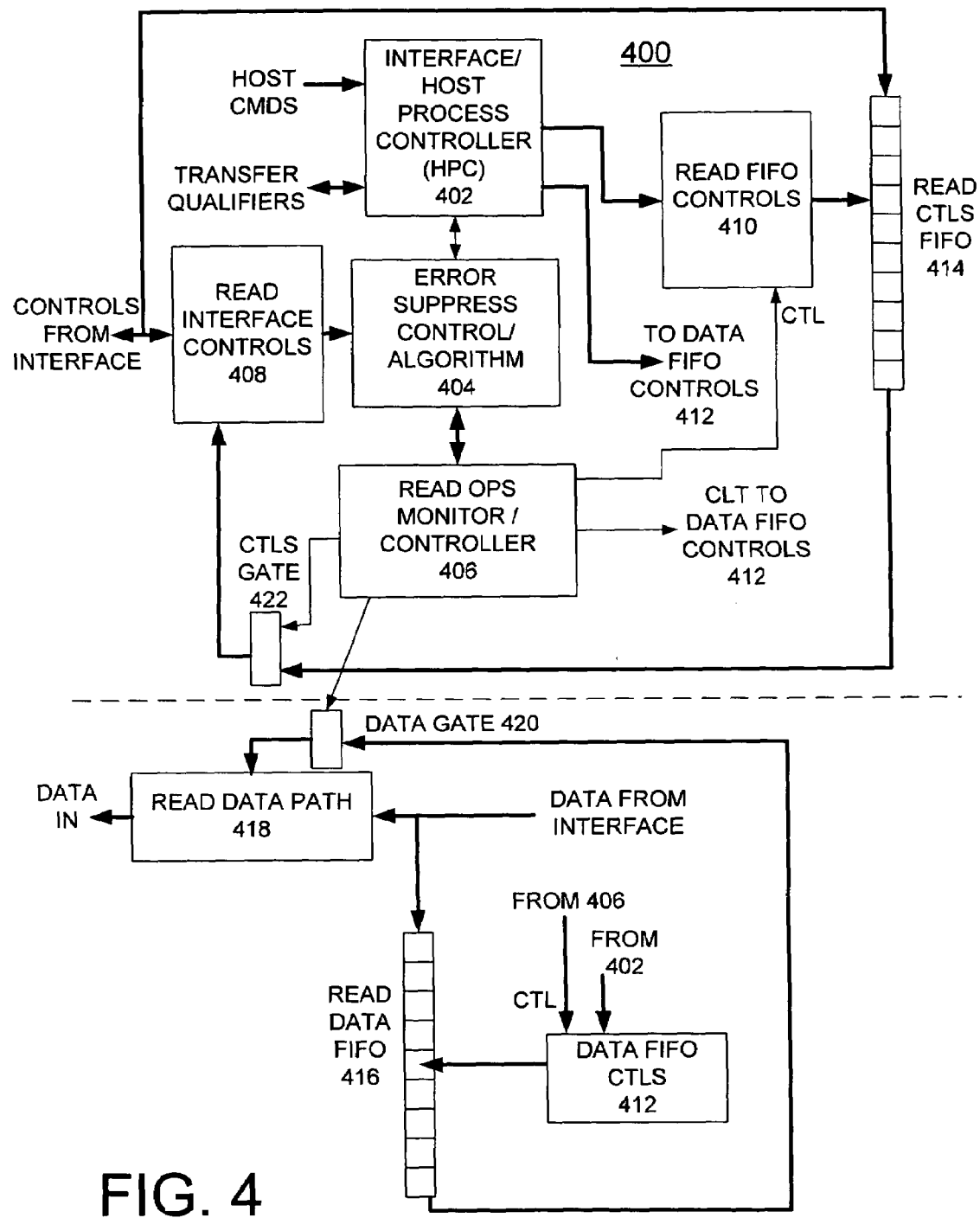
FIG. 4 is a block diagram of a read path of an intelligent slave device transfer control unit of the shared memory system of FIG. 1 in accordance with the preferred embodiment.

In accordance with features of the preferred embodiment of the invention, the intelligent slave control unit 202 further illustrated and described with respect to FIGS. 3 and 4 advantageously is integrated into a slave device connected to a shared memory bus structure 100, such as slave devices 108,112. This intelligent slave control unit 202 monitors the interface and captures error conditions when they occur and depending on the set up of the unit by the host processor master device 106, the intelligent control unit 202 suppresses the errors that have been trapped and enables the operation to resume from the point where the errors occurred. This intelligent control unit contains two main functional islands that are both implemented separately for both read and write paths or read and write operations from/to the slave device.

In accordance with features of the preferred embodiment of the invention, one of the two main islands contains a Host Process Controller that interfaces with the host or main processor on the bus and operates according to host commands setting the level and involvement of this control unit's operations. This island also includes an Error Suppression Algorithmic functional unit that determines when an error has occurred on the interface and if and when this error can be suppressed. For each operational path, that is for the read and write paths both, there is also a unit called an Ops Monitor/Controller that monitors the operations and that feeds the results to the Error Suppression unit and controls when to gate controls to the interface. The other functional island controls the data from and to the interface, depending on whether a write or read operation is being done, and is controlled itself by both the Host Process Controller and Ops Monitor/Controller. The controls and the data from the shared memory bus interface are stored in FIFOs for each, that are configurable by the host processor and that enable the operations to the resumed by retaining the controls and data until needed.

In accordance with features of the preferred embodiment of the invention, advantages are provided over existing interfaces and controls in that existing interfaces and controls do not offer such a suppression and resumption capability and thereby do not offer the bandwidth savings of continuing an operation after an error, without the need for starting the operation over and having to waste cycles. The intelligent slave control unit 202 of the invention offers recovery that is seamless for error interruptions, enabling designers to more effectively utilize the potential performance of the system bus structure.

Intelligent slave control unit 202 of the preferred embodiment includes two distinct paths to the invention, one for the write path and the other for the read path. The designs for the write path and for the read path are similar, but are distinct and differ mostly on the direction of data flow. FIG. 3 shows the high-level data flow and controls for the write path of the intelligent slave control unit 202. FIG. 4 shows the high-level data flow and controls for the read path of the intelligent slave control unit 202.

Referring now to FIG. 3, there is shown a write path of the intelligent slave control unit 202 generally designated by the reference character 300 for implementing seamless error resumption in accordance with the preferred embodiment. Slave control unit write path 300 includes four main control blocks including a Write Interface/Host Process Controller 302, an Error Suppress Control Algorithmic 304, a Write Ops Monitor/Controller 306, and a Write Interface Controls 308, along with a Write FIFO Controls block 310 and a Data FIFO controls block 312 respectively for a Write Controls FIFO 314 and a Write Data FIFO 316. The overall flow of a write data path 318 of the slave control unit write path 300 processes data from the interface and communicates with the particular shared bus 102, 104 that is attached in the slave control unit write path 300, via the interface control signals as shown in FIG. 2. The Write Host Process Controller 302 interfaces with the host or main processor 106 on the bus and operates according to host commands setting the level and involvement of the operations of slave control unit write path 300. The Write Error Suppress Control Algorithm 304 determines when an error has occurred on the interface and determines when an identified error can be suppressed. The Write Ops Monitor/Controller 306 communicates with the Error Suppress Control Algorithm 304 and controls when to gate controls to the interface applying control signals to a data gate 320 and a controls gate 322. The data gate 320 is coupled between the Write Data FIFO 316 and the write data path 318. The controls gate 322 is coupled between the Write Controls FIFO 314 and the Write Interface Controls 308. The Write Interface Controls 308 control the data from the interface, for a write operation being done and feeds controls to the Write Error Suppress Control Algorithm 304. The controls and the data from the shared memory bus interface are stored in respective FIFOs 314, 316 that are configurable by the host processor 106. FIFOs 314, 316 enable the operations to the resumed by retaining the controls and data until needed.

As data are processed by the slave device 108, 112 for a write operation, the Write Interface Controls block 308 maintains communication with the bus interface controls to continue the operation or end the operation. These interface controls also are fed to the Write Controls FIFO 314, which stores the controls, in the event that the current operation does encounter an error and in the event that the current operation can and will be flagged as one that the slave could suppress or resume gracefully. The Interface/Host Process Controller 302 is responsible for decoding commands from the host processor 106 that enables or disables error controls of this intelligent slave control unit 202 and is responsible for communicating with the shared bus interface to process the transfer qualifiers. The host processor 106 is also responsible for setting the depth of the Write Controls FIFO 314 and Write Data FIFO 316, via the Interface/Host Process Controller 302.

Once the intelligent slave control unit 202 is set up to process errors, an algorithm to maintain the correct transfer protocol, in the case of a transfer error, is used to suppress and resume the interface controls. This algorithm, within the Error Suppress Control/Algorithm block 304, is kept aware of the current operation's controls on the interface and when any certain type of error is encountered on the interface, as determined by this algorithm, then the Error Suppress Control/Algorithm block 304 references its lookup table to prepare a predefined protocol to suppress and then resume the interface's operation. As the Error Suppress Control/Algorithm block 304 processes the errors encountered, the Error Suppress Control/Algorithm block 304 controls the Write Operations Monitor/Controller 306 that controls the controls gate 322 that ultimately gates the controls that have been stored in the Write Controls FIFO 314 back onto the bus controls interface or the Write Interface Controls 308. The Write Controls FIFO 314 stores the interface controls as they come in from the interface, so that in the event an error is encountered and the slave controller's function has been enabled by the host processor 106, then those controls can still be used.

The depth of the Write Controls FIFO 314, the controls for writing the FIFO and keeping track of its contents and pointers, as well as when to read out its data is the function of the Write FIFO controls block 310, in conjunction with the Write Operations Monitor/Controller 306. These parameters are applied via the Interface/Host Process Controller block 302. If the function of this intelligent slave control unit 202 has been enabled, then the controls from the Write Controls FIFO 314 are read out and gated into the Write Interface Controls block 308 by the Write Operations Monitor/Controller 306. As the controls from the shared bus interface are being processed by the slave controller's error suppression controls or blocks 302, 304, 306, 308, 310, 314, and 322 shown in the upper-half of FIG. 3, above the dashed line, the write data from the interface is also being processed by the blocks 312, 316, 318, and 320 to control the data, in the case of an error. These blocks shown in the lower-half of FIG. 3, below the dashed line, include the Data FIFO controls block 312, the write data path registers 318, and the Write Data FIFO 316.

As the data comes in on the write data bus from the shared bus, the data is stored into the write data FIFO 316. This is done so that in the event of an error on the interface that is to be suppressed, then that data can be read out of the FIFO 316. The data is the gated into the write data path registers 318 to be sent out on the data out bus, back to the shared bus 102, or 104. The Interface/Host Process Controller 302 also supplies parameters to the Data FIFO Controls block 312. The Data FIFO Controls block 312 controls the depth of the Write Data FIFO 316 and controls the writing/reading of data to/from the FIFO 316 and keeps track of the FIFO's contents and pointers. The Write Operations Monitor/Controller 306 finally determines the point to gate controls from the Write Controls FIFO 314 onto the controls interface via the controls gate 322. The Write Operations Monitor/Controller 306 also gates the respective data onto the write data path 318 via the data gate 320, completing the error suppression and resumption cycle for each transfer.

Referring now to FIG. 4, there is shown a read path of the intelligent slave control unit 202 generally designated by the reference character 400 for implementing seamless error resumption in accordance with the preferred embodiment. Slave control unit read path 400 differs from the slave control unit write path 300 in the direction of the data into and out of its logic. Slave control unit read path 400 similarly includes four main control blocks including a Read Interface/Host Process Controller 402, an Error Suppress Control Algorithmic 404, a Read Ops Monitor/Controller 406, and a Read Interface Controls 408, along with a Read FIFO Controls block 410 and a Data FIFO controls block 412 respectively for a Read Controls FIFO 414 and a Read Data FIFO 416. The overall flow of a read data path 418 of the slave control unit write path 400 processes read data from the interface and communicates with the particular shared bus 102, 104 that is attached in the slave control unit read path 400, via the interface control signals as shown in FIG. 2. The Read Host Process Controller 402 interfaces with the host or main processor 106 on the bus and operates according to host commands setting the level and involvement of the operations of slave control unit read path 400. The Read Error Suppress Control Algorithm 404 determines when an error has occurred on the interface and determines when an identified error can be suppressed. The Read Ops Monitor/Controller 406 feeds the results to the Error Suppress Control Algorithm 404 and controls when to gate controls to the interface applying control signals to both a data gate 420 and a controls gate 422. The data gate 420 is coupled between the Read Data FIFO 416 and the read data path 418. The controls gate 422 is coupled between the Read Controls FIFO 414 and the Read Interface Controls 408. The Read Interface Controls 408 control the data from the interface, for a read operation being done and feeds controls to the Write Error Suppress Control Algorithm 404. The controls and the data from the shared memory bus interface are stored in respective FIFOs 414, 416 that are configurable by the host processor 106. FIFOs 414, 416 enable the operations to the resumed by retaining the controls and data until needed.

Once the control unit logic of the write path 300 or the read path 400 has completed the whole transfer, then the next set of host commands has already been loaded into the Interface/Host Process Controller 302, 402 and, if needed, is processing the next set of transfer qualifiers. These transfer qualifiers initialize the subsequent transfer and the new set of host commands also clear the contents from the previous transfer that were held in each of the FIFOs 314, 316, and FIFOs 414, 416 and set the depth parameters of the FIFO for the new transfer. Once this segment of operation has occurred, then this intelligent slave control unit 202 continues its operations with the new transfer.

While the present invention has been described with reference to the details of the embodiments of the invention shown in the drawing, these details are not intended to limit the scope of the invention as claimed in the appended claims.

What is claimed is:

1. A method for implementing seamless error resumption in a shared memory bus structure utilizing a slave control unit coupled to the shared memory bus structure, said shared memory bus structure coupled to at least one master device and at least one slave device, and said slave control unit included in said at least one slave device, said slave control unit containing two main functional islands that are both implemented separately for both a write oath and a read path or read and write operations from and to the slave device, said method performed by said slave control unit comprising the steps of:

storing interface controls and data for each read operation and each write operation;

monitoring each read operation and each write operation to determine when an error has occurred for a read operation or a write operation;

identifying when an error has occurred and capturing error conditions when said error can be suppressed for the read operation or the write operation; and suppressing said error; and gating said stored interface controls and data to continue the read operation or the write operation: and resuming without restarting the read operation or the write operation.

2. A method for implementing seamless error resumption as recited in claim 1 wherein the steps of storing interface controls and data for each read operation and each write operation includes the steps of providing a respective first-in first-out (FIFO) for storing said interface controls and said data for each write operation and each read operation.

3. A method for implementing seamless error resumption as recited in claim 1 wherein the steps of monitoring each read operation and each write operation to determine when an error has occurred for a read operation or a write operation includes the steps of implementing an error suppress control/algorithm for monitoring current operation.

4. A method for implementing seamless error resumption as recited in claim 1 wherein the steps of suppressing said error; and gating said stored interface controls and data to continue the read operation or the write operation includes the steps of providing a controls gate coupled between an interface controls block and a respective first-in first-out (FIFO) for storing said interface controls for each write operation and each read operation; suppressing said error; and gating said controls gate.

5. A method for implementing seamless error resumption as recited in claim 1 wherein the steps of suppressing said error; and gating said stored interface controls and data to continue the read operation or the write operation includes the steps of providing a data gate coupled between a data path block and a respective first-in first-out (FIFO) for storing said data for each write operation and each read operation; suppressing said error; and gating said data gate.

6. Apparatus for implementing seamless error resumption in a shared memory bus structure, said shared memory bus structure coupled to at least one master device and at least one slave device, comprising:
- a slave control unit including two main functional islands; said two main functional islands being implemented separately for both a write path and a read path or read and write operations from and to the slave device; said slave control unit included in said at least one slave device, both said slave control unit write path and said slave control unit read path including:
- an interface/host process controller receiving and processing host commands and transfer qualifiers via a set of interface signals;
- a respective first-in first-out (FIFO) coupled to said interface/host process controller storing interface controls and data for each write operation and each read operation;
- an interface controls block for receiving controls for each write operation and each read operation via said set of interface signals; and
- an error suppress control/algorithm block coupled to said interface/host process controller and said interface controls block monitoring current operations, identifying when an error has occurred, and capturing error conditions when the error can be suppressed; and
- an operations monitor/controller controlled by said error suppress control/algorithm block suppressing the identified error; gating stored interface controls and stored data to continue the read operation or the write operation; and resuming an interface read operation or write operation responsive to the error being detected without restarting the read operation or the write operation.

7. Apparatus for implementing seamless error resumption in a shared memory bus structure as recited in claim 6 includes a controls gate coupled between said interface controls block and said respective first-in first-out (FIFO) for storing interface controls for each write operation and each read operation; and wherein said operations monitor/controller applies a control signal to said controls gate for gating stored interface controls to continue the read operation or the write operation responsive to an error being detected.

8. Apparatus for implementing seamless error resumption in a shared memory bus structure as recited in claim 7 includes a data gate coupled between a data path and said respective first-in first-out (FIFO) for storing data for each write operation and each read operation; and wherein said operations monitor/controller applies a control signal to said data gate for gating stored data to continue the read operation or the write operation responsive to an error being detected.

9. Apparatus for implementing seamless error resumption in a shared memory bus structure as recited in claim 8 includes a respective FIFO controls block coupled to said respective first-in first-out (FIFO) for storing controls; each said FIFO controls block coupled to said interface/host process controller and said operations monitor/controller for receiving controls.

10. Apparatus for implementing seamless error resumption in a shared memory bus structure as recited in claim 8 includes a respective FIFO control coupled to said respective first-in first-out (FIFO) for storing data; each said FIFO controls block coupled to said interface/host process controller and said operations monitor/controller for receiving controls.

* * * * *